(12) United States Patent
Martin

(10) Patent No.: US 12,326,136 B2
(45) Date of Patent: Jun. 10, 2025

(54) WIND POWERED GENERATOR

(71) Applicant: Christopher Neill Martin, Karrinyup (AU)

(72) Inventor: Christopher Neill Martin, Karrinyup (AU)

( * ) Notice: Subject to any disclaimer, the term of this patent is extended or adjusted under 35 U.S.C. 154(b) by 0 days.

(21) Appl. No.: 18/281,344

(22) PCT Filed: Mar. 11, 2022

(86) PCT No.: PCT/AU2022/050212
§ 371 (c)(1),
(2) Date: Sep. 11, 2023

(87) PCT Pub. No.: WO2022/187911
PCT Pub. Date: Sep. 15, 2022

(65) Prior Publication Data
US 2024/0159221 A1    May 16, 2024

(30) Foreign Application Priority Data
Mar. 11, 2021 (AU) .................... 2021900711

(51) Int. Cl.
*F03D 13/20*    (2016.01)
*F03D 1/04*    (2006.01)
(Continued)

(52) U.S. Cl.
CPC ......... *F03D 13/2005* (2023.08); *F03D 1/053* (2023.08); *F03D 3/0418* (2013.01);
(Continued)

(58) Field of Classification Search
CPC .... F03D 13/2005; F03D 1/053; F03D 3/0418; F03D 13/122; F03D 3/005; F03D 3/02;
(Continued)

(56) References Cited

U.S. PATENT DOCUMENTS 5,709,419 A    1/1998 Roskcy
10,161,382 B2    12/2018 Kogan et al.
(Continued)

FOREIGN PATENT DOCUMENTS

CN    207111299    3/2018
DE    202010014698    4/2011
(Continued)

OTHER PUBLICATIONS

International Preliminary Report on Patentability Dated Mar. 8, 2023 From the International Preliminary Examining Authority Re. Application No. PCT/AU2022/050212. (11 Pages).
(Continued)

*Primary Examiner* — Joseph Ortega

(57) ABSTRACT

A wind powered generator comprising; a mast having a plurality of tower outlets positioned along on a low pressure portion of a length of the mast; one or more inlets positioned on a high pressure portion of the mast; an internal fluid flow path between the inlet and the tower outlets; a turbine in the fluid flow path; wherein the inlet and tower outlets are arranged such that wind creates air flow through the fluid flow path for motivating a turbine.

26 Claims, 14 Drawing Sheets

(51) Int. Cl.
*F03D 3/04* (2006.01)
*F03D 13/10* (2016.01)
*F03D 3/00* (2006.01)
*F03D 3/02* (2006.01)

(52) U.S. Cl.
CPC ............ *F03D 13/122* (2023.08); *F03D 3/005* (2013.01); *F03D 3/02* (2013.01)

(58) Field of Classification Search
CPC ... F03D 1/048; F03D 9/41; F03D 1/04; F03D 13/20; F05B 2210/40; F05B 2240/131; F05B 2240/913; Y02E 10/72; Y02E 10/728
See application file for complete search history.

(56) References Cited

U.S. PATENT DOCUMENTS

| | | | |
|---|---|---|---|
| 11,391,262 | B1 | 7/2022 | Westergaard |
| 2009/0102202 | A1 | 4/2009 | Roskcy |
| 2017/0175707 | A1 | 6/2017 | Beckers et al. |
| 2017/0241406 | A1* | 8/2017 | Coffman ................... F03D 9/34 |

FOREIGN PATENT DOCUMENTS

| | | |
|---|---|---|
| DE | 202011106529 | 12/2011 |
| DE | 102016006702 | 5/2017 |
| DE | 102017001644 | 9/2018 |
| EP | 2395235 | 12/2011 |
| FR | 2379709 | 9/1978 |
| JP | S594637 | 3/1984 |
| WO | WO 2010/009544 | 1/2010 |

OTHER PUBLICATIONS

International Search Report and the Written Opinion Dated May 2, 2022 From the International Searching Authority Re. Application No. PCT/AU2022/050212. (12 Pages).
International-Type Search for Your Provisional Patent Application Dated Oct. 14, 2021 From the Australian Government, IP Australia Re. Application No. 2021900711. (15 Pages).
Allaei et al. "Invelox: Description of a New Concept in Wind Power and Its Performance Evaluation", Energy, 69: 336-344, Available Online Apr. 8, 2014.
Informe de Busqueda [Search Report] Dated Jul. 29, 2024 From the Ministerio de Economia, Fomento y Turismo, INAPI, Gobierno de Chile Re. Application No. 202302695. (3 Pages).
Supplementary European Search Report and the European Search Opinion Dated Jun. 10, 2024 From the European Patent Office Re. Application No. 22766002.4. (8 Pages).
Communication Pursuant to Article 94(3) EPC Dated Apr. 11, 2025 From the European Patent Office Re. Application No. 22766002.4. (4 Pages).

* cited by examiner

WIND POWERED GENERATOR

RELATED APPLICATIONS

This application is a National Phase of PCT Patent Application No. PCT/AU2022/050212 having International filing date of Mar. 11, 2022, which claims the benefit of priority of Australia Patent Application No. 2021900711 filed on Mar. 11, 2021. The contents of the above applications are all incorporated by reference as if fully set forth herein in their entirety.

FIELD AND BACKGROUND OF THE INVENTION

The present invention relates to a wind powered generator for generating power.

The following discussion of the background art is intended to facilitate an understanding of the present invention only. It should be appreciated that the discussion is not an acknowledgement or admission that any of the material referred to was part of the common general knowledge as at the priority date of the application.

Cleaner energy sources, and in particular renewable energy sources, are developed in response to ongoing changes in climate and to reduce/eliminate reliance on non-renewable energy sources, such as fossil fuels. Clean and renewable energy sources come from many different sources including, but not limited to, hydropower, solar, wind and nuclear.

Broadly speaking, wind powered turbines for generating electrical power comprise a turbine with large radially extending blades on a tower. The blades rotate the turbine in response to wind flow. The turbine is connected to a drive shaft which drives an electrical generator.

Wind powered turbines have a number of drawbacks environmentally as well as psychologically which disincentivise their use. Wind powered turbines are open to air and as such, wildlife in the area of wind turbines can be impacted and killed or injured by the blades. The height of the componentry introduces a risk to installation and maintenance workers.

Furthermore, residents living in areas surrounding wind turbines commonly express nuisances or fears such as noise, danger from the blades and having a heavy load so high above them. This has contributed to a phenomenon known as "Not In My Backyard" which is a characterisation of residents opposition to developments which are perceived as unpleasant and/or dangerous, such as wind turbines, in their local area while raising no objections or supporting the use elsewhere.

It is against this background that the embodiments herein have been developed.

Throughout the specification unless the context requires otherwise, the word "comprise" or variations such as "comprises" or "comprising", will be understood to imply the inclusion of a stated integer or group of integers but not the exclusion of any other integer or group of integers.

Throughout the specification unless the context requires otherwise, the word "include" or variations such as "includes" or "including", will be understood to imply the inclusion of a stated integer or group of integers but not the exclusion of any other integer or group of integers.

SUMMARY OF THE INVENTION

According to a first aspect, there is provided a wind powered generator comprising:
  a mast having a plurality of tower outlets along its length;
  one or more inlets;
  an internal fluid flow path between the inlet and the tower outlets;
  a turbine in the fluid flow path;
  wherein the inlet and tower outlets are arranged such that wind creates air flow through the fluid flow path for motivating the turbine.

In an embodiment, the one or more tower outlets are positioned on a low pressure portion of the mast and the inlet is positioned on a high pressure portion of the mast.

In an embodiment, the one or more tower outlets are positioned on a side of the mast.

In an embodiment, the wind powered generator comprises a windward facing opening configured to direct air into one or more inlets;

In an embodiment, the opening is a scoop opening.

In an embodiment, the opening is on the mast.

According to a second aspect, there is provided a wind powered generator comprising:
  a mast rotatably coupled to a base, the mast configured to rotate such that a windward portion is oriented to face into the wind according to the direction of the wind;
  one or more inlets;
  one or more tower outlets positioned on a side of the mast such that when the wind flows across the one or more tower outlets a pressure differential is created between the one or more tower outlets and the one or more inlets to create an air flow through an internal fluid flow path between the one or more tower outlets and the one or more inlets; and
  a turbine in the fluid flow path configured to operate when the air flow is created in the fluid flow path.

According to a third aspect, there is provided a wind powered generator comprising:
  a mast rotatably coupled to a base, the mast configured to rotate such that a windward portion is oriented to face into the wind according to the direction of the wind;
  one or more tower outlets positioned on a side of the mast and one or more inlets positioned on the windward portion of the mast;
  an internal fluid flow path between the one or more tower outlets and the one or more inlets; and
  a turbine in the fluid flow path such that when the one or more inlets receives an air flow, the air flow is moved through the fluid flow path operating the turbine.

According to a fourth aspect, there is provided a wind powered generator comprising:
  a mast rotatably coupled to a base, the mast configured to rotate such that a windward portion is oriented to face into the wind according to the direction of the wind;
  one or more tower outlets positioned on a low pressure portion of the mast and one or more inlets positioned on a high pressure portion of the mast;
  an internal fluid flow path between the one or more tower outlets and the one or more inlets;
  a turbine in the fluid flow path such that a pressure differential between the one or more tower outlets and the one or more inlets generates an air flow that operates the turbine.

According to a fifth aspect, there is provided a wind powered generator comprising:
  a mast rotatably coupled to a base, the mast configured to rotate such that a windward portion is oriented to face into the wind according to the direction of the wind;

one or more tower outlets positioned at a different height on the mast relative to one or more inlets position on the mast;

a conduit defining an internal fluid flow path between the one or more tower outlets and the one or more inlets;

a turbine in the fluid flow path such that a pressure differential between the one or more tower outlets and the one or more inlets generates an air flow that operates the turbine.

In an embodiment, the one or more tower outlets on the mast are vertically spaced from the one or more inlets.

In an embodiment, the one or more tower outlets on the mast are higher than the one or more inlets.

In an embodiment, the tower outlets are positioned on the side portion of the mast.

In an embodiment, the tower outlets are positioned at about or before a transition from the windward portion of the mast to the leeward portion of the mast.

In an embodiment, there are a plurality of tower outlets which are evenly spaced along the longitudinal length of the mast.

In an embodiment, there are a plurality of tower outlets which are evenly spaced along the horizontal length of the mast.

In an embodiment, the inlets are positioned on the windward portion of the mast.

In an embodiment, each of the one or more inlets are substantially larger in cross sectional area than each of the one or more tower outlets.

In an embodiment, a combined sum of the cross sectional area of the tower outlets is larger than a combined sum of the cross sectional area of the inlet or inlets.

In an embodiment, a weight of the one or more inlets improves the foundational integrity of the wind power generator.

In an embodiment, the weight of the one or more inlets causes the centre of gravity and centre of mass of the apparatus to be at a lower height.

In one embodiment, the wind powered generator comprises a scoop.

In an embodiment, the scoop is configured to direct air into the one or more inlets.

In an embodiment, the scoop is configured to reduce fluid flow velocity at a scoop opening by between 85% and 95%.

In an embodiment, the weight of the scoop lowers the centre of mass of the apparatus. In an embodiment the centre of mass is close to ground level.

In an embodiment, the wind powered generator comprises more than one turbine in the flow path.

In an embodiment, the one or more turbines are in the base.

In an embodiment, the one or more turbines are in the mast.

In an embodiment, at least one turbine is in the base and at least one turbine is in the mast.

In an embodiment, the wind powered generator comprises one or more flow regulating means within the flow path.

In an embodiment, the one or more flow regulating means is a non-return valve.

In an embodiment, the one or more flow regulating means is a gate valve.

In an embodiment, the one or more non-return valves are reed valves.

Alternatively, the one or more non-return valves are check valves.

In an embodiment, the wind powered generator comprises at least two flow regulating means within the flow path, wherein at least one of the flow regulating means is a gate valve, and at least one of the flow regulating means is a non-return valve.

In an embodiment, the wind powered generator comprises at least one gate valve configured to throttle airflow into the turbine.

In an embodiment, the wind powered generator comprises at least one non-return valve configured to operate one or more tower outlets selectively or automatically.

In an embodiment, the at least one non-return valve is further configured to prevent reverse flow of air through the one or more tower outlets.

In an embodiment, the wind powered generator comprises a plurality of column turning vanes configured to direct air flow travelling up an internal column cavity of the mast, out toward the leeward portion, so that air flow is substantially aligned with the direction of the wind upon exiting the mast.

In an embodiment, the mast comprises baffles configured to better align air flow at the tower outlets.

In an embodiment, the mast comprises an outlet cavity, a leeward cavity, and a plurality of outlet channel turning vanes configured to turn the air flow from leeward in the leeward cavity, to windward in the outlet cavity.

In an embodiment, the column turning vanes comprise non-return valves configured to limit reverse flow between the leeward cavity and the column cavity In an embodiment, the outlet channel turning vanes comprise non-return valves configured to limit reverse flow between the outlet cavity and the leeward cavity.

In an embodiment, the mast comprises a plurality of outlet turning vanes configured to turn the air flow from windward in the outlet cavity to leeward upon exiting the tower outlets.

In an embodiment, the outlet turning vanes comprise non-return valves configured to limit reverse flow into the outlet cavity from the freestream air flow.

In an embodiment, the base comprises a pile and a pile top assembly.

In an embodiment, the base further comprises a bearing thereby allowing the mast to rotate with respect to the pile.

In an embodiment, the bearing is a slewing bearing.

According to a sixth aspect, there is provided a method of generating power comprising coupling a mast to a base so as to rotate such that a windward portion faces into the wind according to the direction of the wind;

providing one or more inlets on the mast;

providing one or more tower outlets on the mast on a side portion of the mast such that when the wind flows across the one or more tower outlets a pressure differential is created between the one or more tower outlets and the one or more inlets to create an air flow through an internal fluid flow path between the one or more tower outlets and the one or more inlets; and;

providing a turbine in the fluid flow path configured to operate when the air flow is created in the fluid flow path such that the turbine generates power.

According to a seventh aspect, there is provided a method of generating power comprising rotating a mast so as to face into the wind;

receiving an air flow through one or more inlets;

directing the air flow into a fluid flow path and exiting through one or more tower outlets on the mast;

motivating a turbine within the fluid flow path with the air flow in the fluid flow path;

wherein the turbine is operatively coupled to an electric generator, generating electric power, or motivating a rotationally powered device, such as a water pump.

In an embodiment, a shape of the mast causes the mast to rotate according to the direction of the wind.

In an embodiment, rotating the structure is done manually according to the direction of the wind.

In an embodiment, rotating the structure is by a motor according to the direction of the wind.

In an embodiment, the motor is an electric motor.

BRIEF DESCRIPTION OF THE SEVERAL VIEWS OF THE DRAWINGS

A preferred embodiment of the invention will now be described byway of example with reference to the following drawings, in which.

DESCRIPTION OF SPECIFIC EMBODIMENTS OF THE INVENTION

Figure 1:
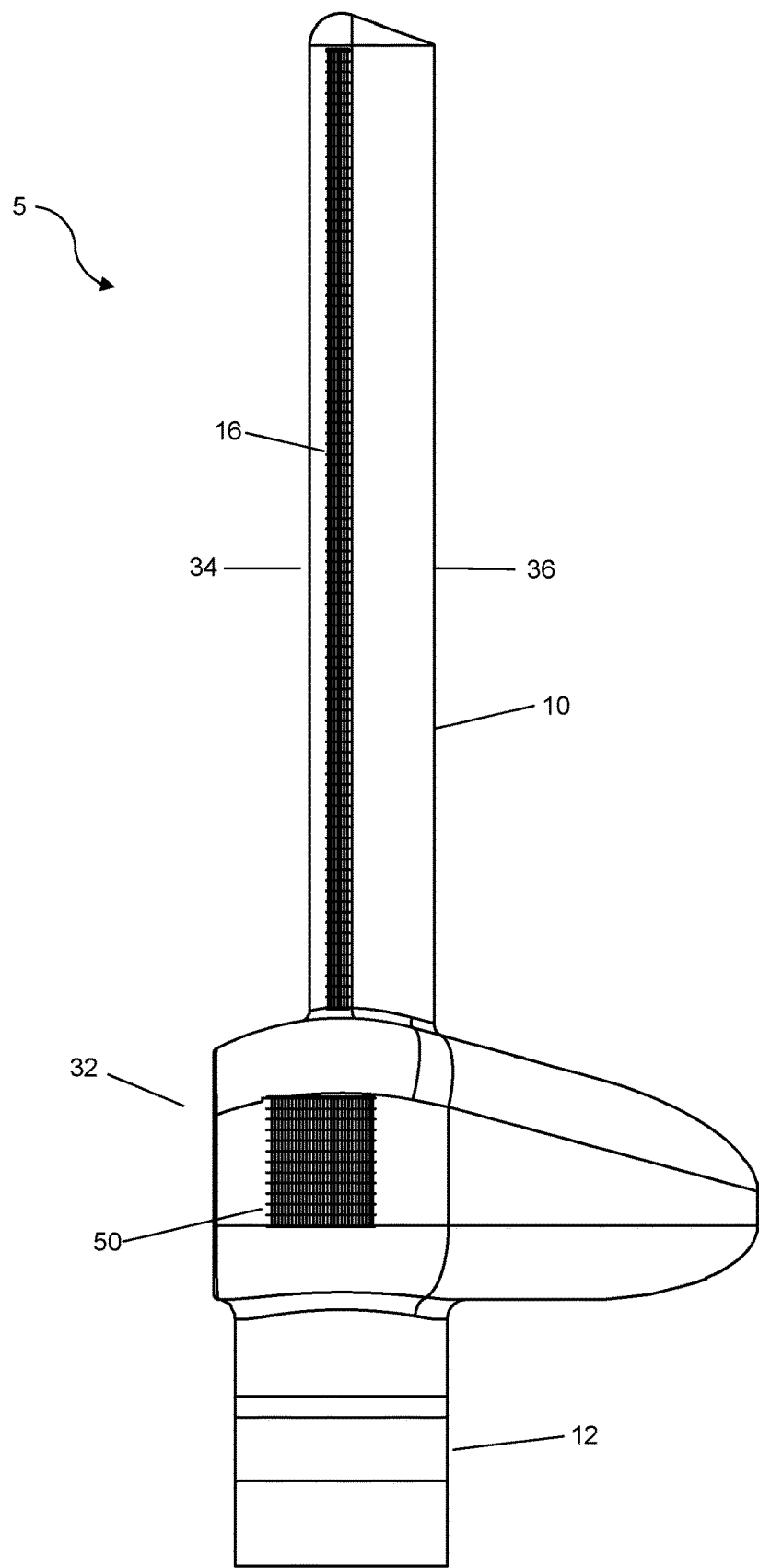
FIG. 1 is a side view of the wind powered generator according to an embodiment of the present invention.
Figure 2:
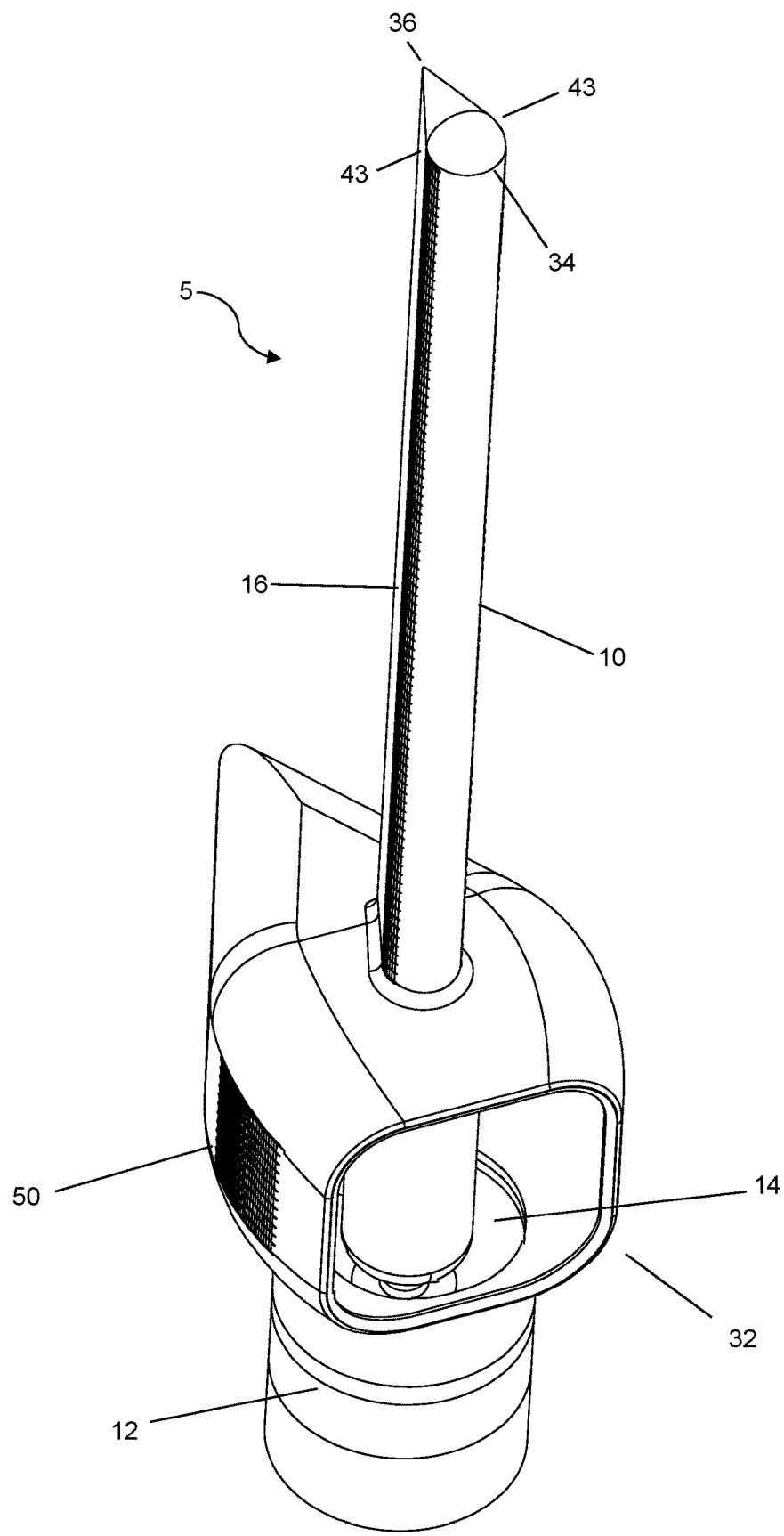
FIG. 2 is an isometric view of the wind powered generator according to an embodiment of the present invention.
Figure 5:
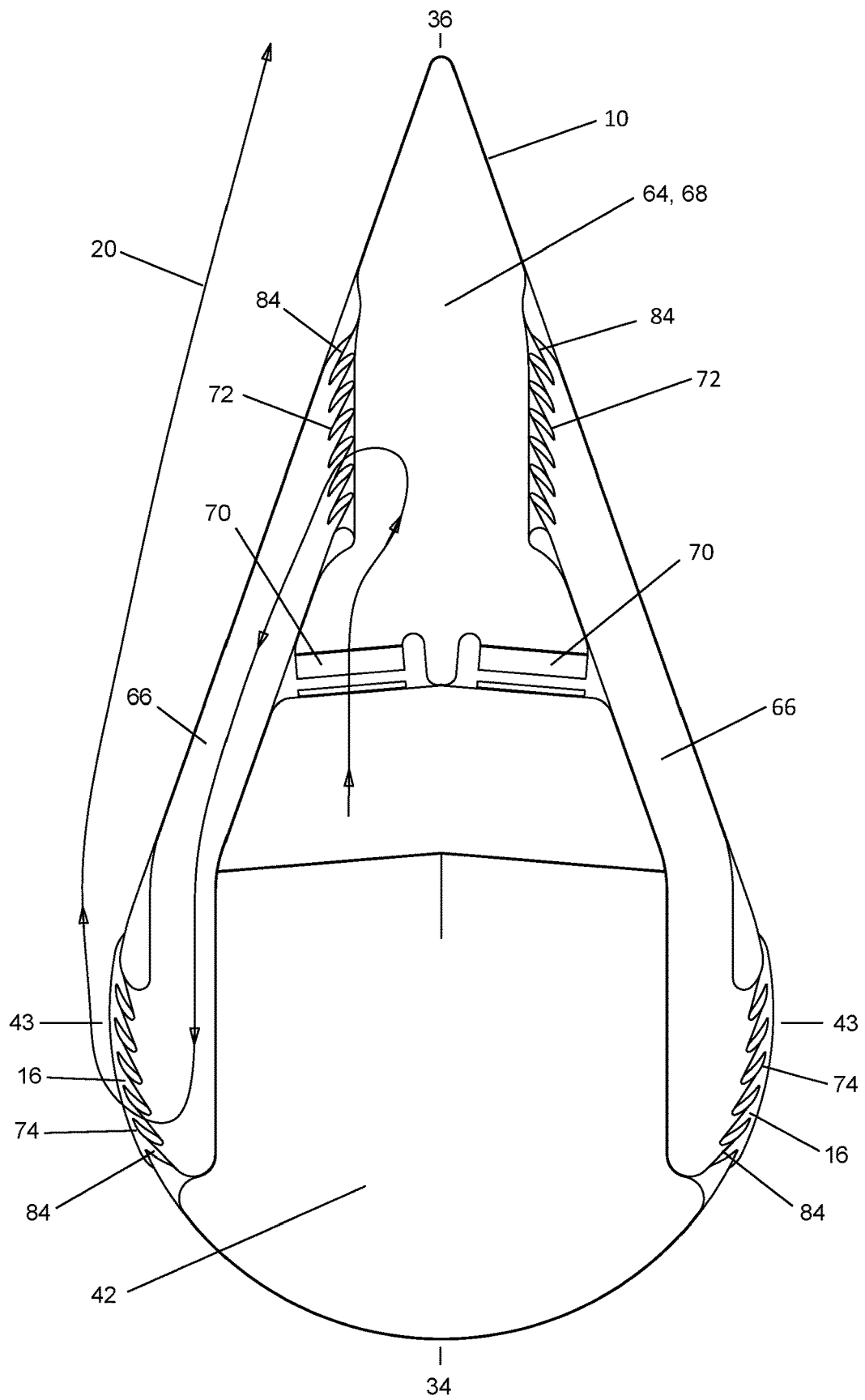
FIG. 5 is horizontal cross section view of the mast and outlets according to an embodiment of the invention.

Referring to FIGS. 1 and 2, there is provided a wind powered generator (hereinafter also referred to as a wind tower 5) comprising a mast 10 preferably rotatably coupled to a base 12 having one or more tower outlets 16, in this case about 60, arranged longitudinally along the length of the mast 10. The mast 10 is mounted by a slewing bearing 38 so as to be able to rotate about its longitudinal axis. In this embodiment the shape of mast 10 is a symmetrical aerofoil (as seen in FIG. 5) such that when the wind flows around the mast 10 it creates a low pressure area on both sides 43 due to the Bernoulli effect causing the mast 10 to rotate such that the windward portion 34 faces into the wind and the leeward portion 36 faces away from the wind (this principle is discussed in further detail below). In an embodiment, the symmetrical aerofoil shape is teardrop shaped in horizontal cross-section. However, the person skilled in the art would readily appreciate that the exact dimensions may vary provided the mast 10 is suitable for rotating in response to the direction of the wind.

As the wind contours around the mast 10 moving transverse to the tower outlets 16 it creates a low pressure area outside each of the tower outlets 16 and due to the venturi effect causes pressure differential within a flow path. An inlet 14 or plurality of inlets 14 are positioned near the base 12 within a scoop 32 that helps concentrate and direct additional incoming wind to enter into the inlets 14.

Figure 3:
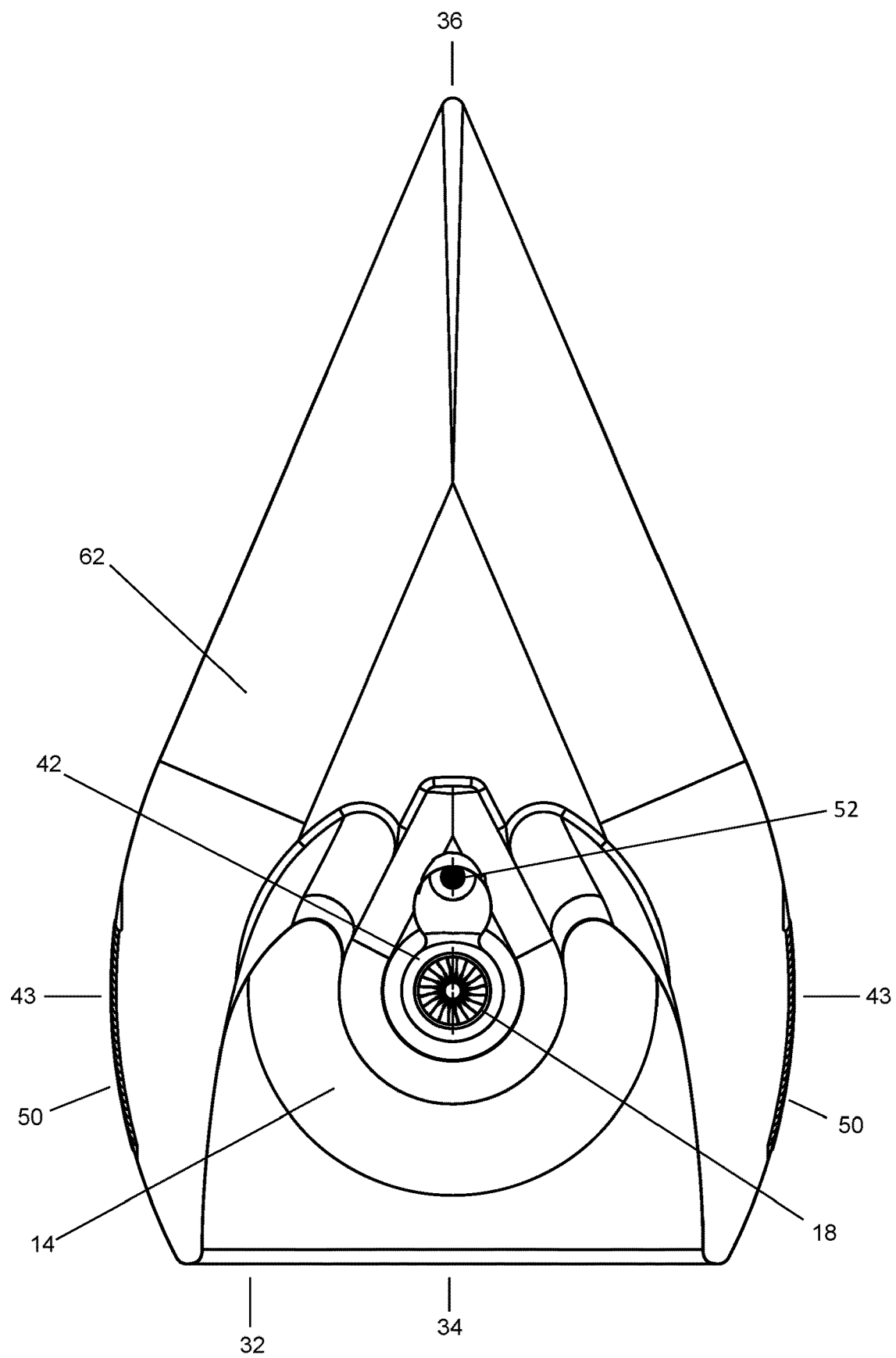
FIG. 3 is a horizontal cross section of the scoop, inlets and scoop outlets of the wind powered generator according to an embodiment of the invention.
Figure 4:
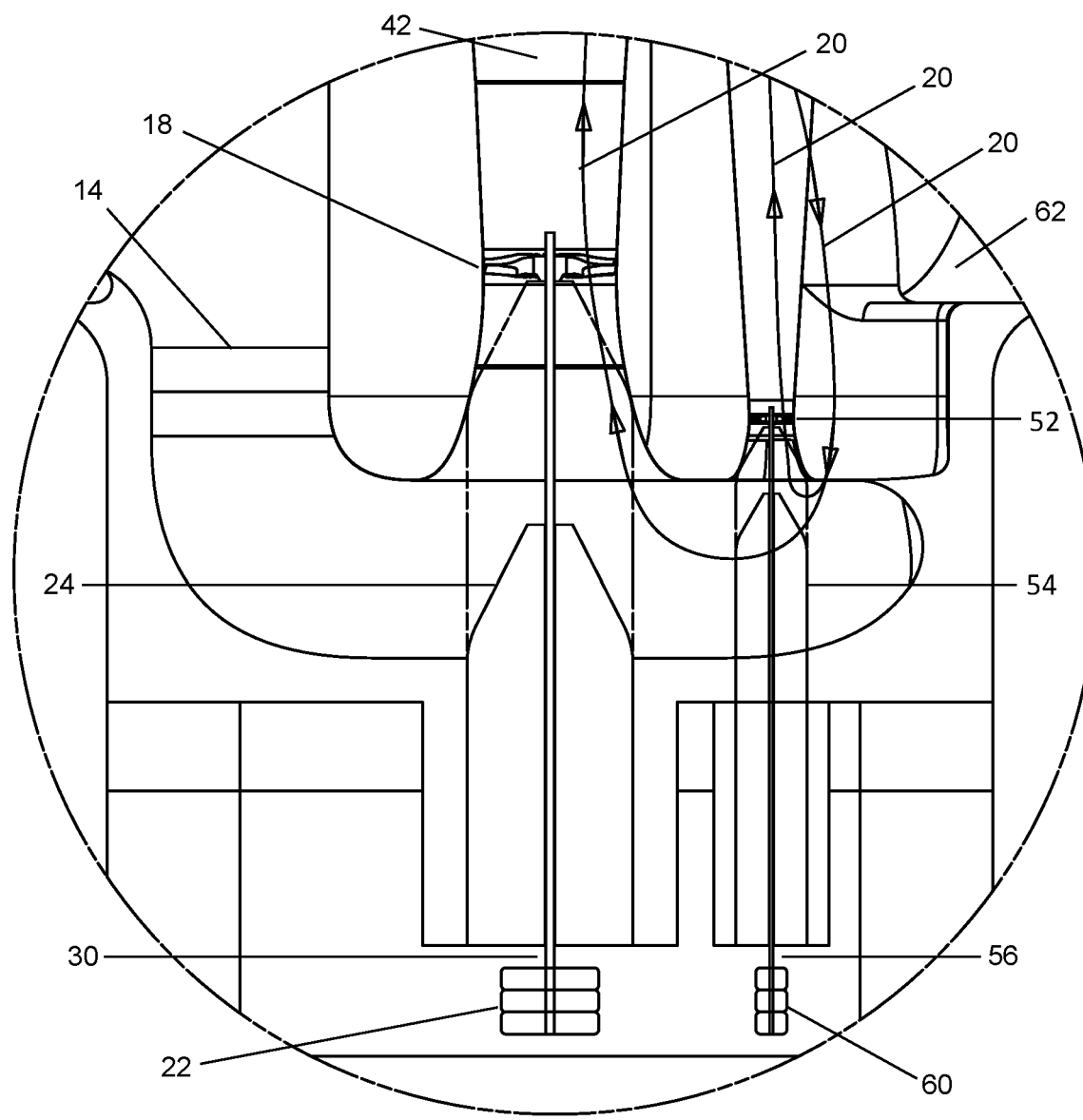
FIG. 4 is a vertical cross section view of the turbine according to an embodiment of the invention.

As shown in FIGS. 3 and 4, the wind enters into the inlets 14 shown and is directed through one or more channels which converge to the fluid flow path having a turbine 18 placed within, such that the high pressure at the inlets 14 and the low pressure at the tower outlets 16 creates an air flow 20 which operates the turbine 18. The turbine 18 may be operably coupled to an electric power generator 22, such as by drive shaft 30, which can generate electric power. The turbine 18 may also be operably coupled to another means of doing work or generating power.

The scoop 32 may be configured to reduce the fluid flow velocity at the scoop 32 opening by at least 80%, thus increasing the pressure so as to create a greater pressure differential between the inlets 14 and turbine 18.

The scoop 32 may be optimally configured to reduce the fluid flow velocity at the scoop 32 opening by approximately 90%.

The air flow 20 along the internal fluid flow path between the one or more turbines 18 and the tower outlets 16 reduces the velocity of the air flow through the tower outlets 16, for example to 50% of the freestream velocity, thus increasing the pressure so as to create a greater pressure differential between the tower outlets 16 and the freestream pressure at sides 43.

Similarly, the air flow 20 along the internal fluid flow path between the one or more turbines 18 and the scoop outlets 50 reduces the velocity of the air flow through the scoop outlets 50, for example to 50% of the freestream velocity, thus increasing the pressure so as to create a greater pressure differential between the scoop outlets 50 and the freestream pressure at sides 43.

A smooth surface profile and gradual reduction in area between the scoop 32, the inlets 14 and the turbine 18 may keep losses to a minimum and increase efficiency.

A smooth surface profile and gradual increase in area between the turbine 18 and the column cavity 42 may keep losses to a minimum and increase efficiency.

In the embodiment provided, the tower outlets 16 are positioned at a height above the inlets 14 such that wind at higher altitudes is able to be directed across the tower outlets 16 to increase the pressure differential between the inlets 14 and the tower outlets 16. The taller the mast 10 the less likely to have obstructions blocking the flow of the wind and/or producing turbulent air flow. Ideally, the inlets 14 will be positioned on the windward portion 34 which is naturally an area having a higher pressure relative to the naturally lower pressure area on the sides 43 where the tower outlets 16 are positioned, which are typically generally leeward of the windward portion 34. A high differential in pressure will result in a faster air flow 20 through the fluid flow path causing the turbine 18 to operate and generate more power.

The turbine 18 can vary in size based on expected conditions and within its operation limits. In this embodiment, the turbine 18 is contained within a portion of the mast 10 and the base 12. Accordingly, risk factors associated with maintenance, wildlife and noise which are normally present in other wind powered generators which have their turbines open to air may be reduced and/or eliminated using the present invention. Advantageously, having the turbine 18 closer to ground level reduces the risk when performing maintenance work at heights.

Referring to FIG. 3, there is provided a cross-sectional plan view of the inlets 14 positioned around the turbine 18. In this embodiment, the base 12 comprises a manifold which receives air through inlets 14 and is channeled until their respective flow paths converge into the fluid flow path which the turbine 18 is positioned within. In this embodiment, the scoop 32 condenses and directs wind into the inlets 14 which have channels to direct the air through the turbine 18, as shown in FIG. 4. The size of the inlets 14, for example 6 metres in diameter, can be chosen based on maximum speeds of the turbine 18 and/or by historical meteorological records based on the areas of where the apparatus is to be installed.

The speed of the turbine 18 and, by extension, the amount of electricity that can be generated will be limited by the volumetric flow rate of air the wind tower 5 is capable of allowing flow from the inlets 14 to the tower outlets 16. Accordingly, the size of the inlets 14 may be larger in areas where large gusts of wind are common and/or where the wind tower 5 is installed having a relatively larger turbine 18. As such, the location of installation and historical meteorologic conditions may inform the desired size of the turbine 18 which in turn can be used to determine the size of inlet 14 and/or tower outlets 16 required to accommodate the air necessary to allow the turbine 18 to operate at a required speed to produce a desired output of electricity. As environmental conditions are seasonal, the ability to effectively disconnect one or more tower outlets 16 from operation may be desired.

Alternative embodiments may comprise at least one additional small turbines 52 in the flow path operably connected to a small electric power generator 60. The small turbines 52 may be adjacent to each other in stages or spaced apart along a small drive shaft 56.

The turbine 18 may comprise variable pitch turbine blades to govern the rotational speed and the torque applied to the electric power generator 22.

Referring to FIGS. 4 and 5, the one or more tower outlets 16 on the mast 10 are preferably evenly spaced along a longitudinal length of the mast 10 and fluidly open from a column cavity 42 which forms a part of the fluid flow path within the mast 10. The tower outlets 16 are positioned on one or both of the sides 43, preferably at or just before a transition from the windward portion 34 to the leeward portion 36.

A gate valve 24 may also be positioned between the one or more inlets 14 and the turbine 18 (as seen in FIG. 4). The gate valves 24 individually, or in combination, may be used to regulate an air flow 20 during operation and/or maintenance to assist in reducing or preventing operation of the turbine 18. The reduction in operation may be to address issues with, for example, noise, electric output or other meteorological conditions.

The one or more inlets 14 have a substantially larger cross sectional area than the tower outlets 16 making the inlets 14 heavier than the tower outlets 16. The extra weight provided by a scoop 32 and/or the one or more inlets 14 in conjunction with their proximity being lower on the mast relative to the tower outlets 16 improves the foundational integrity of the wind tower 5. Positioning the inlets 14 lower on the mast 10 and/or within the base 12 lowers the centre of mass and centre of gravity to reduce or lower the potential of the wind tower 5 toppling or tipping.

The scoop 32 concentrates air to be directed through the one or more inlets 14. The reduction of cross section caused by the shape of the scoop 32 concentrating the air flow 20 causes the velocity of the air entering the one or more inlets 14 to increase, thereby increasing the speed of the turbine 18. The scoop 32 may be coupled to the wind tower 5 to the mast 10 and/or the base 12. The scoop may also be formed as part of the mast 10 or the base 12.

Referring to FIG. 5, there is provided a cross section of the mast 10 at one of the tower outlets 16 showing one version of the symmetrical aerofoil form. As explained by the Bernoulli principle, the increase in velocity of the wind as it moves around the mast 10 creates a low pressure area on the sides 43 of the mast 10. As the mast 10 is symmetrical, the low pressure area is created on both sides 43 of the leeward portion 36 of the mast thereby exerting forces on both sides 43 of the leeward portion 36. However, the forces on both sides of the leeward portion 36 if uneven cause the mast 10 to rotate until the forces are equal but opposite and result in the windward portion 34 facing into the wind and the leeward portion 36 facing away from the wind.

As the wind blows on the mast 10 it moves around the windward portion 34 and, as explained by the Coanda effect, the wind has a tendency to stay attached to the surface as it moves around the mast 10 and transverse to the tower outlets 16. The wind moving transverse to the tower outlets 16 creates a low pressure area immediately outside of each of the tower outlets 16 resulting in a pressure differential which creates the air flow 20 proportional to the pressure difference between the inlets 14 and the tower outlets 16, via the fluid flow path. Accordingly, the pressure differential that exists between the inlets 14 and the tower outlets 16 is caused independently, or in combination, of one or more of the features discussed herein.

Figure 6:
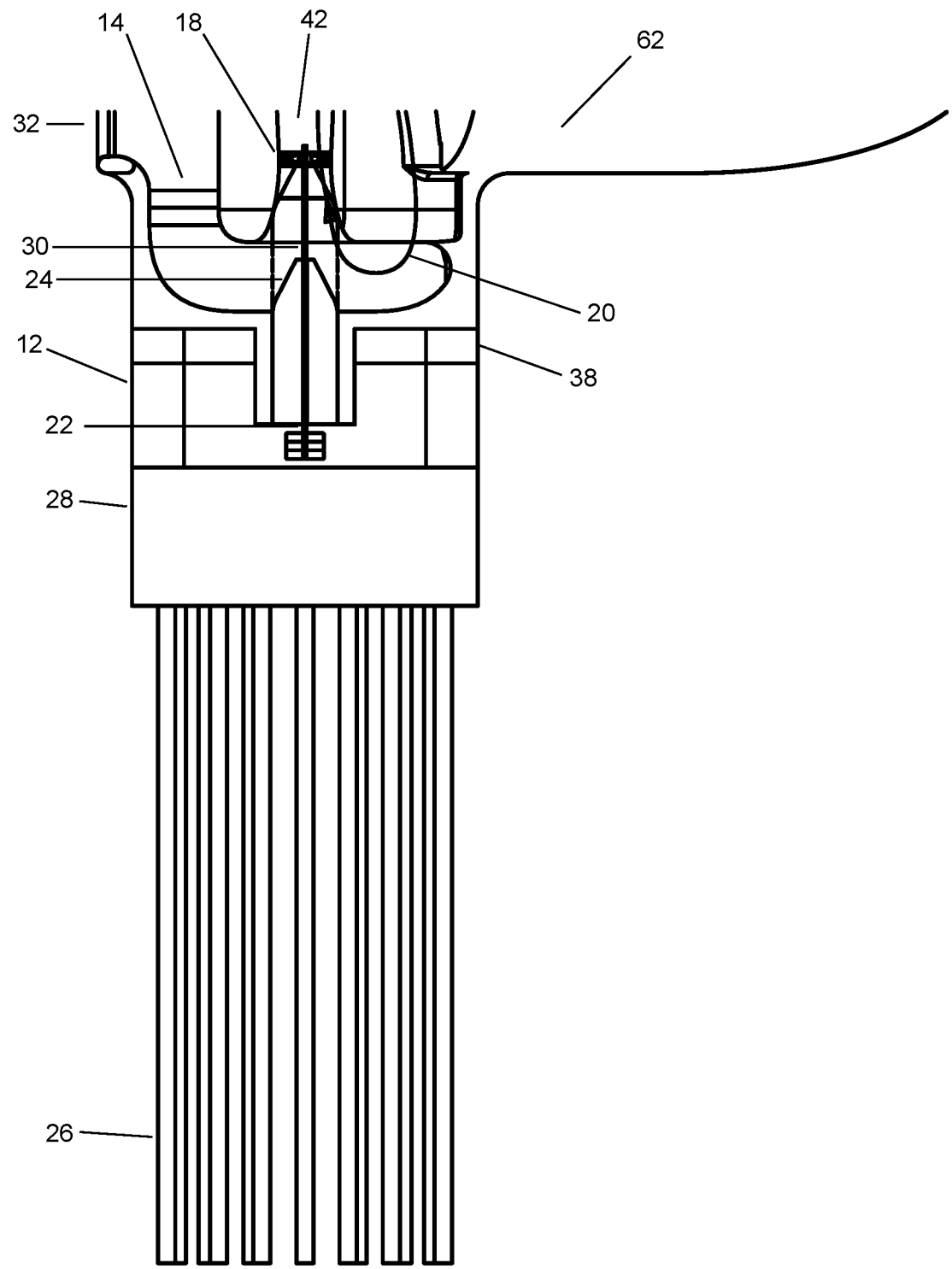
FIG. 6 is a vertical cross section view of the base of an embodiment of the invention.
Figure 7:
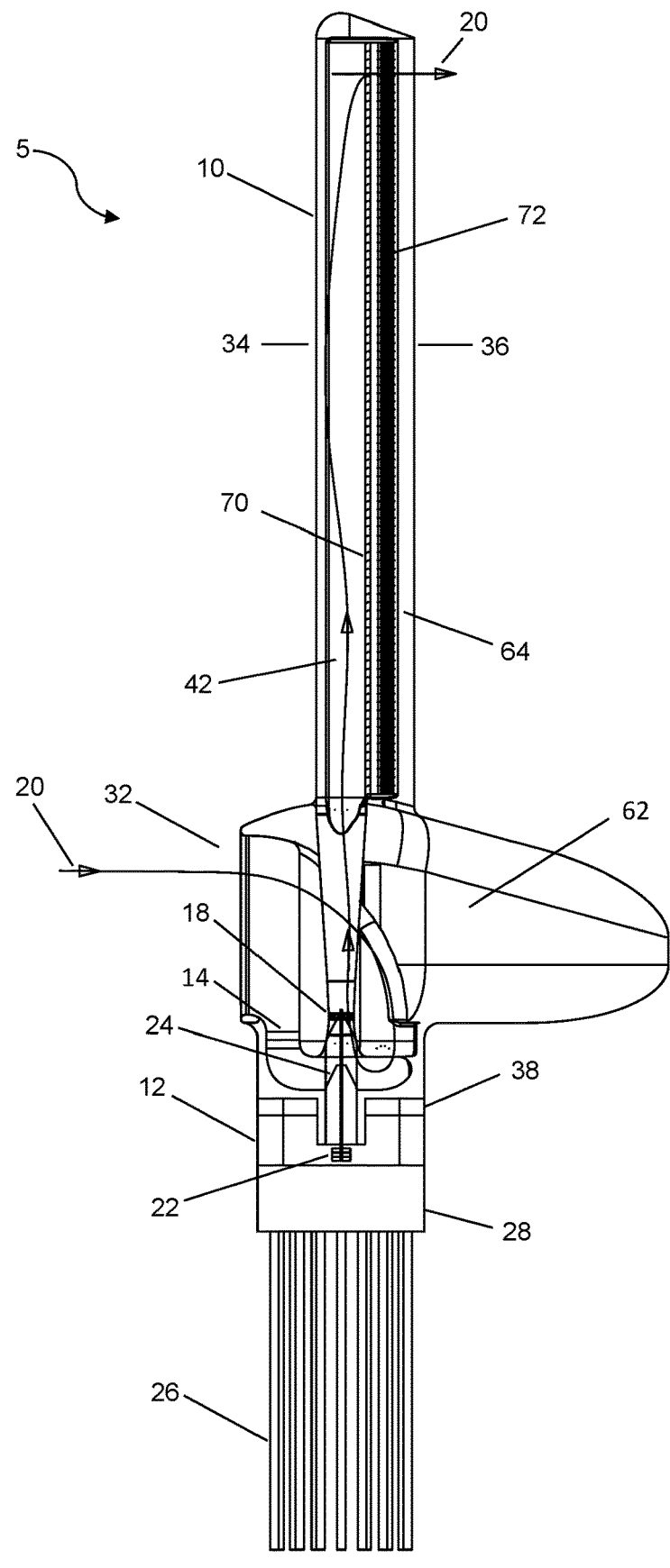
FIG. 7 is a vertical cross section view of the wind power generator of an embodiment of the invention.

Referring to FIGS. 6 and 7, there is provided a cross section view showing piles 26 of the base 12 coupled to a pile top assembly 28. The piles 26 may be a single pile or multiple smaller piles which couple to complementing features on the pile top assembly 28. The base 12 may comprise a slewing bearing 38 which allows the mast 10 to rotate relative to the base 12. The slewing bearing 38 may be configured such that the entirety of the pile top assembly 28 rotates with respect to the piles 26. The slewing bearing 38 may be a turntable bearing, turntable ring or slewing ring.

In this embodiment, the piles 26 are about 38 metres long. However, the length of the piles 26 should be determined by the height of the mast 10. For example, a mast 10 that is 180 metres in height may require piles 26 that are 50 metres long. Conversely, a mast 10 that is 15 metres tall may only require piles 26 that are 2 metres long. In calculating the length required for the piles 26 it would be obvious to include a factor of safety to ensure that the potential for the tipping of the wind tower 5 is as low as reasonably allowable. The factor of safety required may vary by jurisdiction and as such the person skilled in the art would readily appreciate that variations in the length of piles 26 too can vary.

In alternative embodiments of the present invention, the mast 10 may have 10, 20, 30, 40, 50, 70, 80, 90, 100 or another number of tower outlets 16. The mast 10 may have a number of tower outlets 16 based on the height and shape of the mast 10. Generally speaking, the total cross-sectional area of the tower outlets 16 is greater than the total cross sectional area of the inlets 14. Accordingly, the inlets 14 may be circular and 6 metres in diameter and the tower outlets 16 may be rectangular with radial depth equal to the boundary layer thickness. The shape of the inlets 14 and the shape of the tower outlets 16 may be any shape, such as round, square, rectangular, triangular or elliptical. The shape of the inlets 14 and tower outlets 16 may be determined by structural strength, spatial constraints and/or ease of manufacturing.

In the present embodiment, the mast 10 is approximately 135 metres in height from ground level. In other embodiments, the mast 10 may be taller, such as 150 metres, or it may be shorter, such as 120 metres, 100 metres, 75 metres, 50 metres, 40 metres, 30 metres, 20 metres or 10 metres, based on where it is installed and/or local weather conditions. For example, if installed in a residential area the height of the mast 10 may only be limited to a 5 metre mast 10 to meet regulations. Whereas a mast 10 installed in a valley or on a plain may accommodate a 150 metre mast 10 to utilise wind currents at higher altitudes.

In the present embodiment, the tower outlets 16 are spaced evenly along the length of the mast 10. However, in alternative embodiments the tower outlets 16 may be irregularly spaced (i.e. not evenly spaced) along the mast 10. The tower outlets 16 may also be spaced along a portion of the mast 10.

Figure 8:
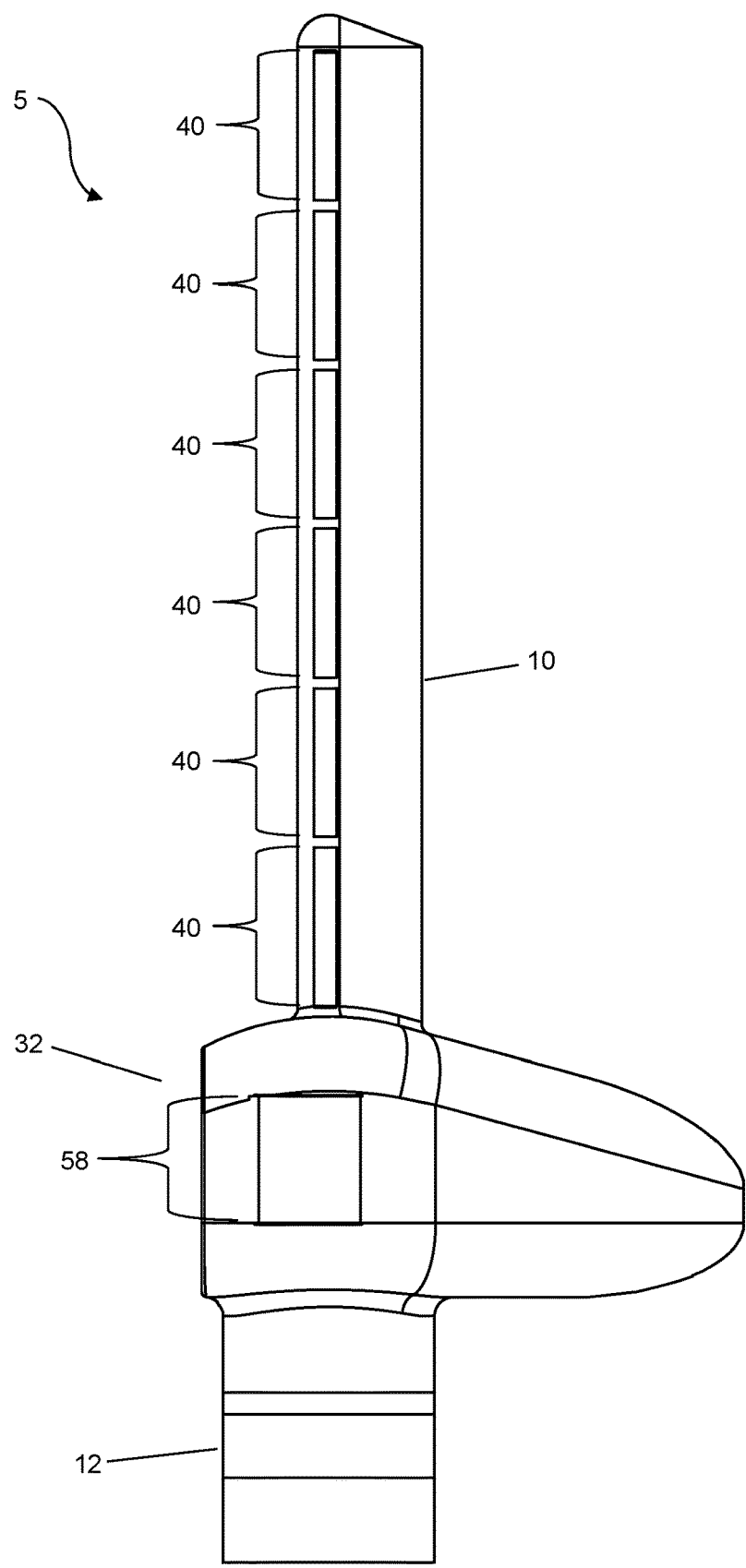
FIG. 8 is a side view of an alternative embodiment of the invention showing outlet banks.

In one embodiment, as shown in FIG. 8, the tower outlets 16 may be concentrated in tower outlet banks 40 of two or more tower outlets 16 at different heights along the length of the mast 10. The position of the tower outlets 16 may be determined by local conditions of where the wind tower 5 is to be installed.

The tower outlet banks 40 may also comprise one or more gate valves (not shown) which are operable along the length of the mast 10 to reduce the number of tower outlets 16 which are operable and within the flow path. Along with gate valves 24, the gate valves at the tower outlet banks 40 allow regulation of the speed of the turbine 18 by throttling the air volume flow rate between the one or more inlets 14 and the one or more tower outlets 16. This can optimise the performance of the wind powered generator.

Figure 9:
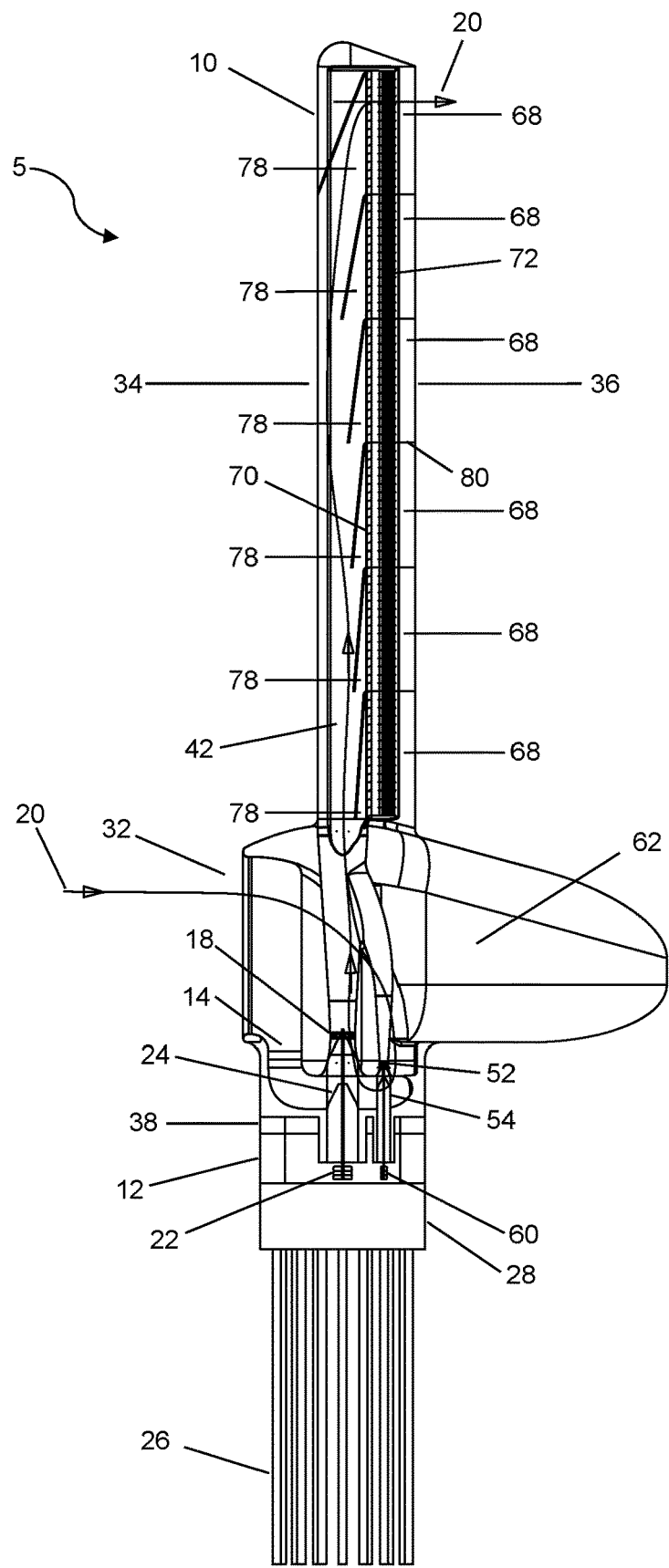
FIG. 9 is a vertical cross section view of the wind power generator of an alternative embodiment of the invention.

Referring to FIG. 9, the fluid flow path 20 may be separated into distinct flow channels 78 after passing through the one or more turbines 18, 52 where the tower outlets 16 are separated into distinct tower baffle cavities 68 and outlet banks 40. In doing so, one or more flow regulating means, such as a gate valve or non-return valve can be positioned within the mast 10 to selectively or automatically operate one or more tower outlet banks 40 to optimise electricity generation from the turbine 18.

For example, when the air flow 20 is created by wind being blown directly into the inlets 14, increasing the tower outlet banks 40 effectively in operation to ensure the velocity of the air flow between the inlets 14 and the operating tower outlets 16 is not reduced can ensure optimal performance of the turbine 18. Alternatively, where the airflow 20 is being created by a pressure differential from varying amounts of wind being blown past the tower outlets 16 or tower outlet banks 40, reducing the effective operational tower outlets 16 or tower outlet banks 40 may result in an increase in velocity of the air flow 20 through the fluid flow path thereby causing the turbine 18 to generate more electric power. The mast 10 may be large enough in height such that there are multiple layers of wind with different characteristics which warrant removing one or more tower outlets 16 or tower outlet banks 40 from operation.

Furthermore, the tower outlets 16 may be positioned at different heights on different sides 43 of the mast 10. Accordingly, on one side 43 the tower outlets may be positioned every 10 metres whereas on the other side 43 it may be every 15 metres. For example, the tower outlets 16 on one side 43 may start from 5 metres from the bottom of the mast 10 and every 10 metres such that the tower outlets alternate every 5 metres between sides 43.

The mast 10 may further comprise baffles 80 configured to better align air flow 20 at the tower outlets 16, the spaces between the baffles 80 may be defined as baffle cavities 68. The baffles 80 may be configured to limit vertical flow of air in the leeward cavity 64 (limiting a pressure drop due to the Bernoulli effect if the air flows past the outlet channel turning vanes 72).

It should be recognised that whilst baffles 80 may be aligned with tower outlet banks 40, both features may be considered independent and are not necessarily required to be used together, baffles 80 may offer advantages where outlet banks 40 are not incorporated, and vice versa.

In the present embodiment, the base 12 comprises a slewing bearing 38. However, a slewing bearing 38 may be intermediate to mast 10 and base 12 as part of the coupling means. The slewing bearing 38 may also be integrated into the mast 10 towards the bottom. The means by which the mast 10 rotates may also be a swivel or a combination of a swivel and slewing bearing 38.

In the present embodiment, the inlets 14 are positioned on the base 12. The one or more inlets 14 may be positioned on the mast 10 with or without the scoop 32. The scoop 32 may also act as the inlet 14.

It is advantageous for the air flow 20 to be guided within the mast 10 to optimise dynamic pressure.

Figure 10:
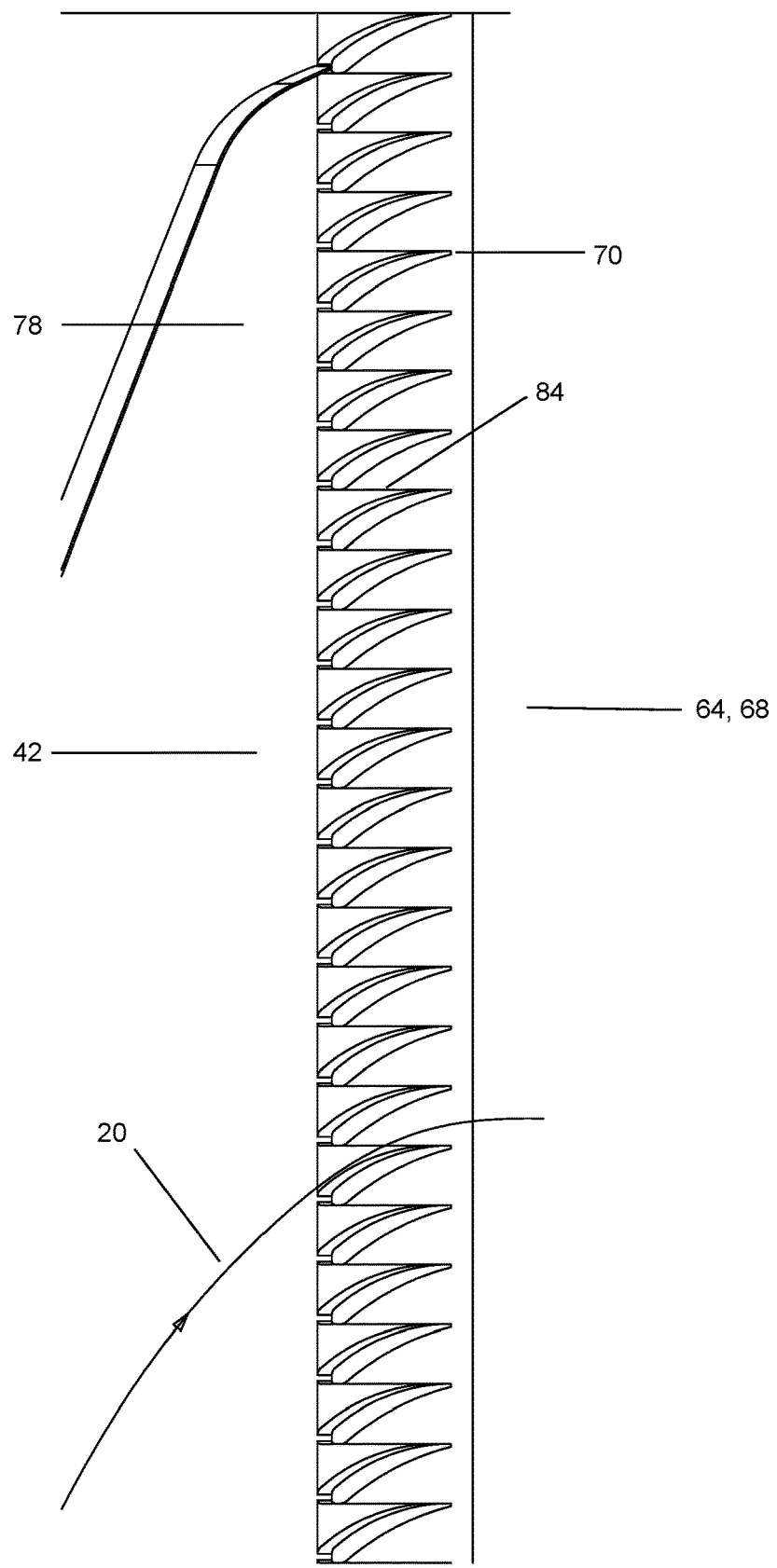
FIG. 10 is a vertical cross section view of the column turning vanes shown in FIGS. 5, 7, and 9, according to an embodiment of the invention.

Referring to FIG. 10, there is provided a plurality of column turning vanes 70 configured to direct air flow 20 travelling up the column cavity 42 or flow channels 78, out toward the leeward portion 36, so that air flow 20 is substantially aligned with the freestream flow upon exiting the mast 10, to optimise dynamic pressure and mitigate the Bernoulli effect from dropping the pressure at the inside part of the outlet ports 16.

The column turning vanes 70 may comprise non-return valves 84 configured to limit reverse flow between the leeward cavity 64 and the column cavity 42.

Figure 11:
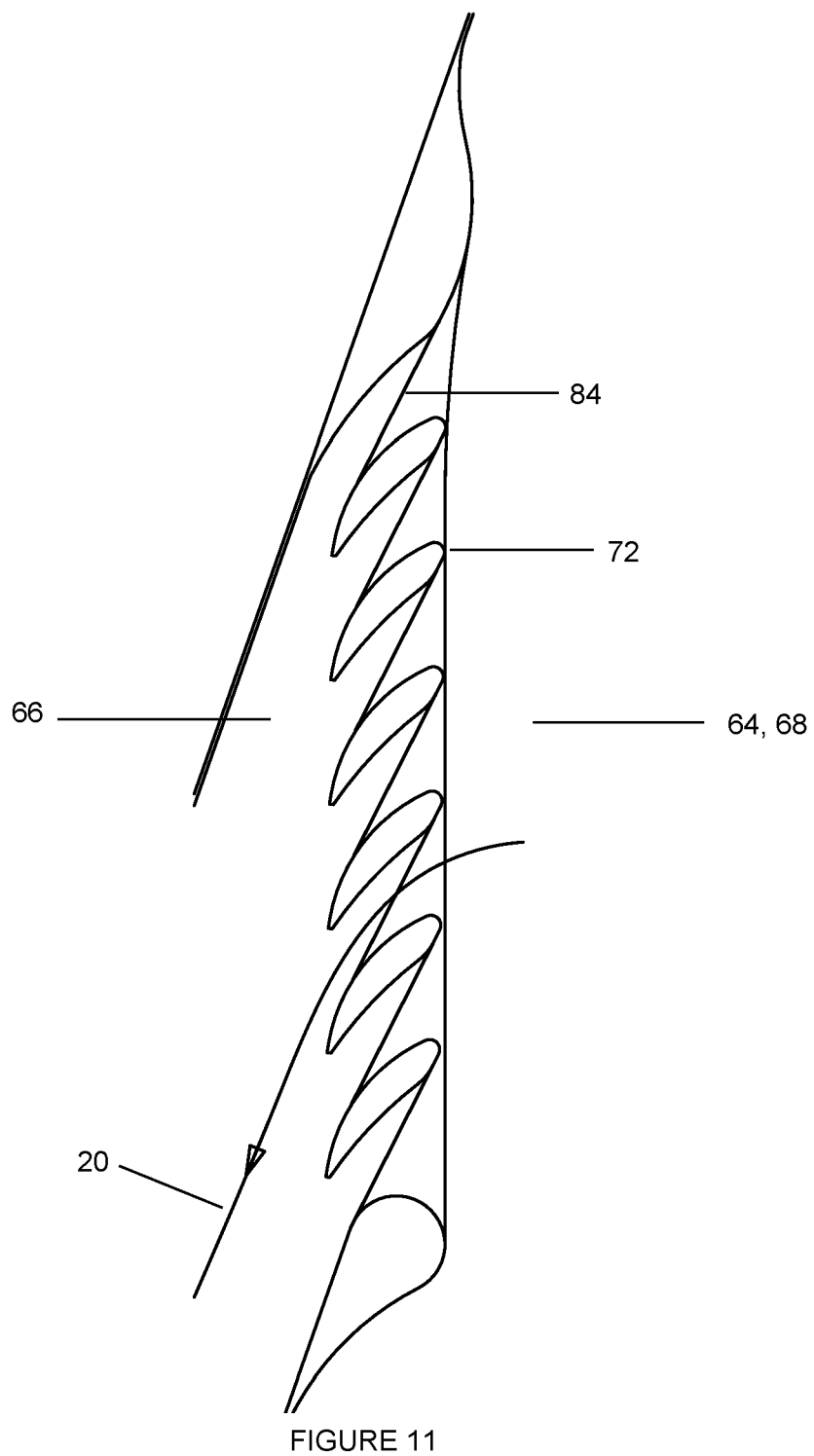
FIG. 11 is a horizontal cross section view of the mast shown in FIG. 5, depicting the channel turning vanes according to an embodiment of the invention.

Referring to FIG. 11, and also to FIG. 5, there is provided a plurality of outlet channel turning vanes 72 configured to turn the air flow 20 from leeward in the leeward cavity 64, to windward in the outlet cavity 66 thus increasing the dynamic pressure at the tower outlets 16.

The outlet channel turning vanes 72 may comprise non-return valves 84 configured to limit reverse flow between the outlet cavity 66 and the leeward cavity 64.

Figure 12:
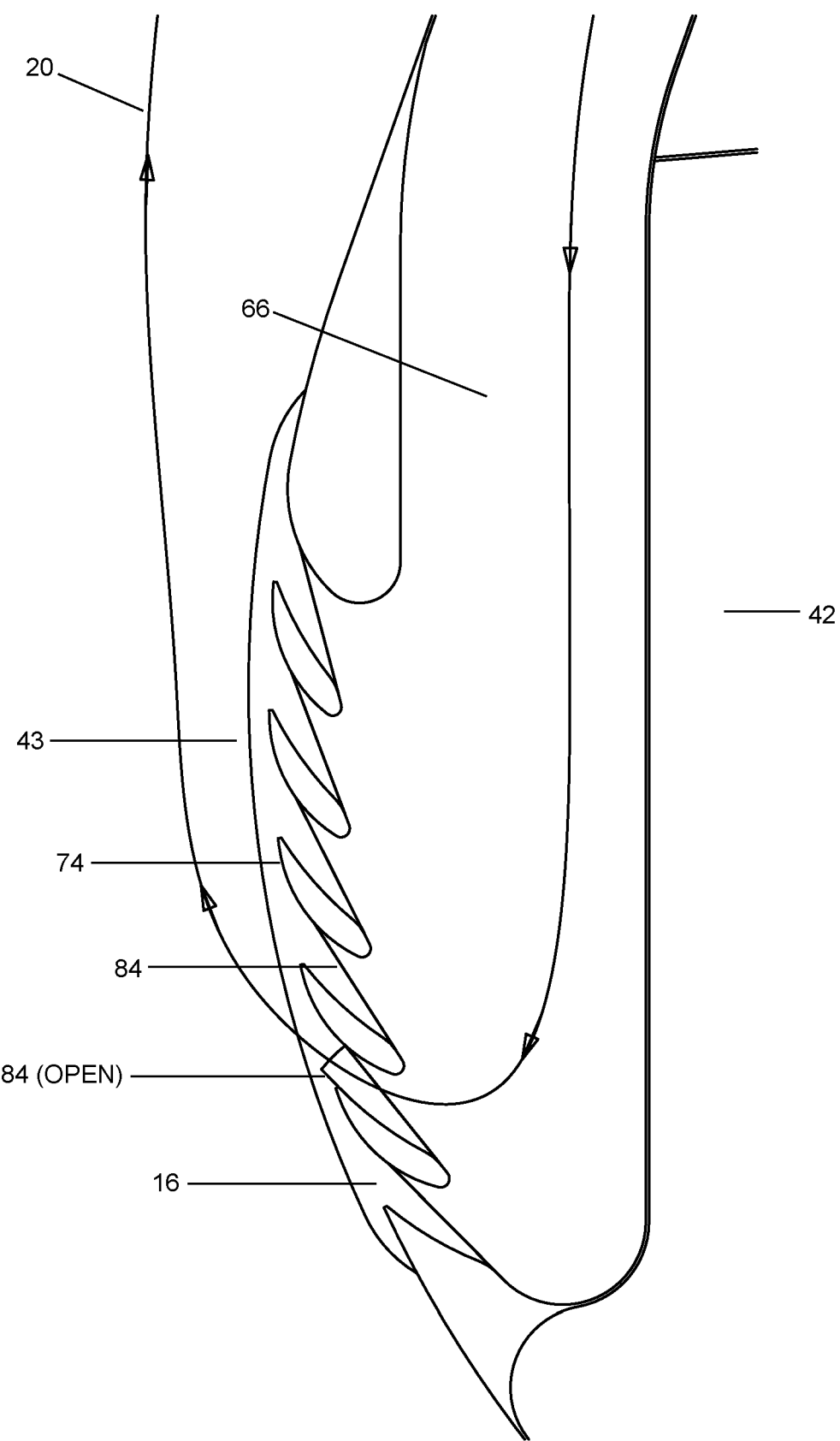
FIG. 12 is a horizontal cross section view of the mast shown in FIG. 5, depicting the outlet turning vanes according to an embodiment of the invention.

Referring to FIG. 12, and also to FIG. 5, there is provided a plurality of outlet turning vanes 74 configured to turn the air flow 20 from windward in the outlet cavity 66 to leeward upon exiting the tower outlets 16, thus increasing the dynamic pressure at the tower outlets 16.

The outlet turning vanes 74 may comprise non-return valves 84 configured to limit reverse flow into the outlet cavity 66 from the freestream air flow.

Figure 13:
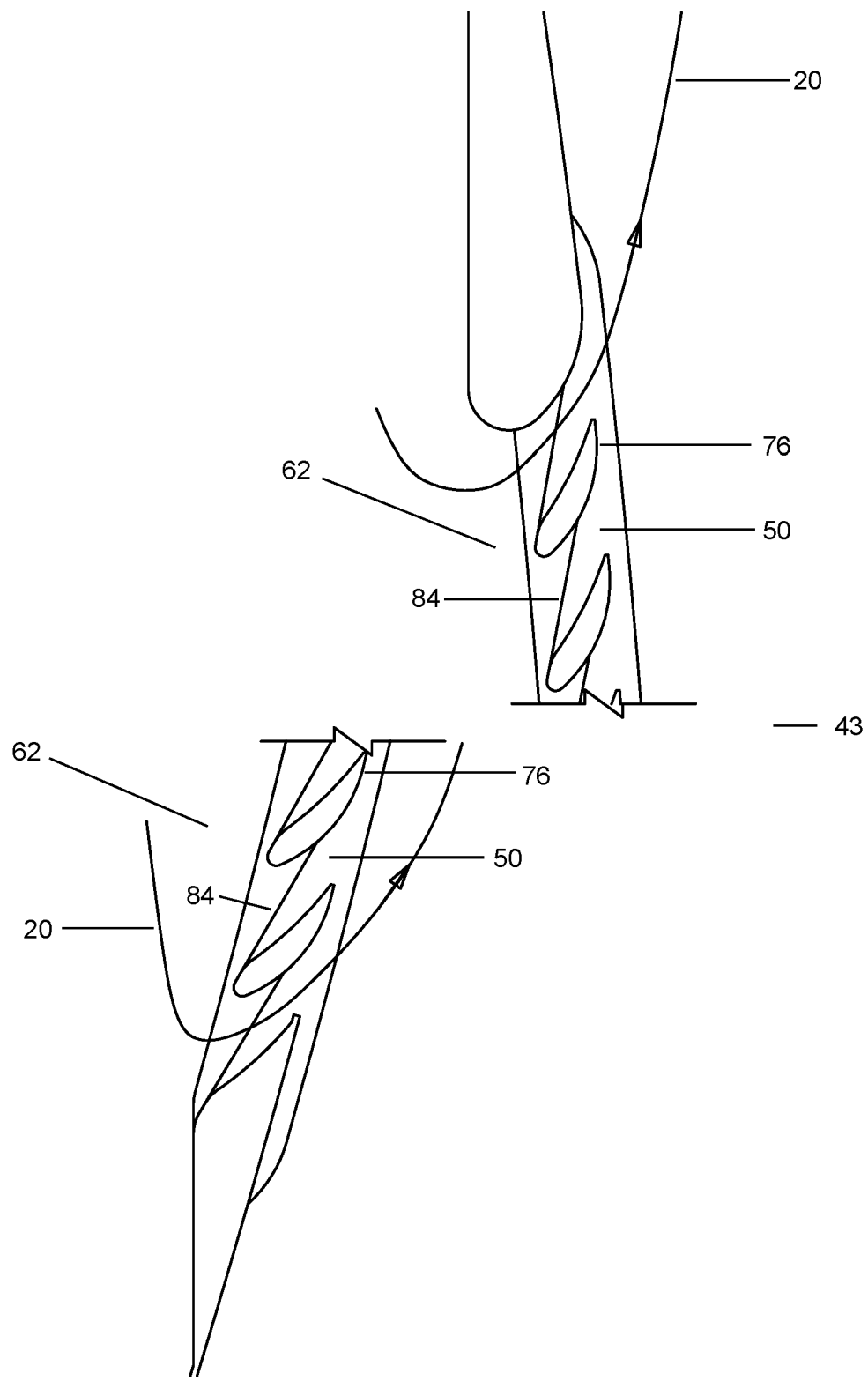
FIG. 13 is a horizontal cross section view of the scoop shown in FIG. 3, depicting the outlet turning vanes according to an embodiment of the invention.

Referring to FIG. 13, there is provided a plurality of scoop outlet turning vanes 76 configured to turn the air flow 20 from windward in the scoop cavity 62 to leeward upon exiting the scoop outlets 50, thus increasing the dynamic pressure at the scoop outlets 50.

The scoop outlet turning vanes 76 may comprise non-return valves 84 configured to limit reverse flow into the scoop cavity 62 from the freestream air flow.

Figure 14:
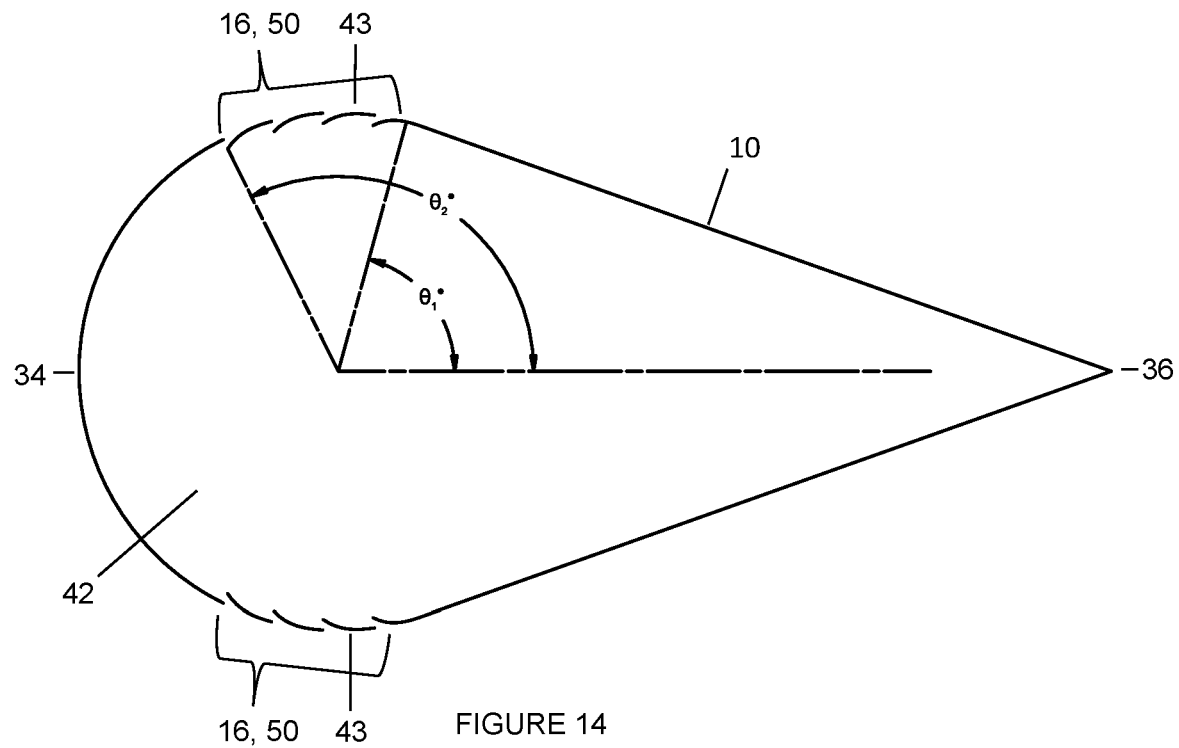
FIG. 14 is a horizontal cross sectional view of an alternative embodiment of the invention showing horizontally spaced apart outlets.

Referring to FIG. 14, there is provided a plurality of tower outlets 16 evenly spaced apart in a horizontal plane at a position along the longitudinal length of the mast 10. The plurality of tower outlets 16 is shown extending between radial positions $\theta_1$ and $\theta_2$. The arrangement depicting the plurality of tower outlets 16 may also be applicable to a plurality of scoop outlets 50.

$\theta_1$ may be optimally 80°, although is not limited as such.

$\theta_2$ may be optimally 115°, although is not limited as such.

The plurality of tower outlets 16 in a horizontal plane may be repeated at a number of positions along the length of the mast 10. Accordingly, the plurality of tower outlets 16 may be positioned, for example, every 5 metres along the longitudinal length of the mast 10. They may be placed in any increment along the length of the mast 10 such as every 1, 2, 3, 4, 5, 10 metres, etc.

The tower outlets 16 may be positioned where the pressure drop at the aerofoil sides 43 is greater than 80% of the difference between the stagnation pressure of the windward portion 34 and the minimum pressure achieved over the aerofoil sides 43.

Similarly, the scoop outlets 50 may be positioned where the pressure drop at the aerofoil sides 43 is greater than 80% of the difference between the stagnation pressure of the windward portion 34 and the minimum pressure achieved over the aerofoil sides 43.

Figure 15:
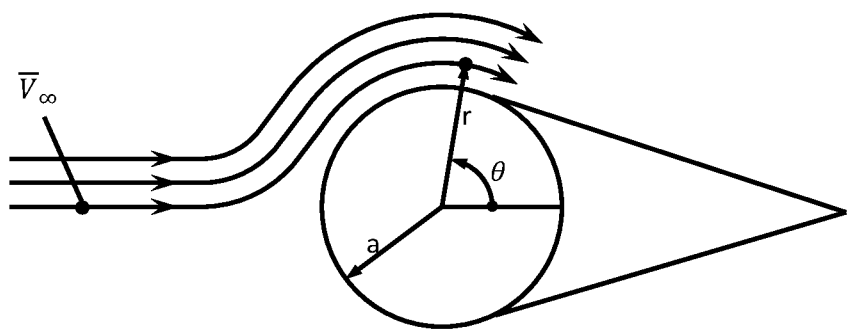
FIG. 15 is cross sectional diagram showing the flow path of air around the mast of an embodiment of the present invention.

Referring to FIG. 15 there is shown the freestream air velocity $\nabla\infty$ and the fluid flow path around the mast 10.

Ideally the ratio of the cumulative area of the tower outlets 16 to the inlets 14 would be governed by the following equations. However, the present invention works on a number of principles wherein only some may require such rigid adherence. The formula below is a mere guide and a starting point when designing the sizes of the tower outlets 16 to the inlets 14. A number of factors including, but not limited to, environmental factors may render this relationship more or less important. For example, in windier locations where the primary drive of the wind powered generator is naturally produced, the sizing may be less important.

$$A_{Outlets} = \frac{32 A_{Turbine}}{\sin\left(\frac{\theta_1 + \theta_2}{2}\right)\left[1 + \frac{a^2}{r^2}\right]}$$

$a$ = Radius of cylinder (m)

$r$ = Radius at point being evaluated (m)

$A_{Outlets} \approx 16 \cdot A_{Turbine}$ $A_{Inlets} = 64 \cdot A_{Turbine}$

Radial depth of individual outlets = Boundary layer thickness

Total vertical length of outlets =

$$\frac{A_{Outlets}}{\text{Number of individual outlets} \times \text{Radial depth of individual outlets}}$$

$A_{Inlets}$: Total Inlet cross sectional area (m$^2$)

$A_{Outlets}$: Total Outlet cross sectional area (m$^2$)

Accordingly, the present invention will still work even if the ratio of the cumulative area of the tower outlets 16 to the inlets 14 does not strictly meet the formula above.

Modifications may be made to the present invention within the context of that described and shown in the drawings. Such modifications are intended to form part of the invention described in this specification.

The invention claimed is:

1. A wind powered generator comprising:
a mast having a plurality of tower outlets positioned along on a low pressure side portion of a length of the mast;
one or more inlets positioned within a scoop on a high pressure windward portion of the mast;
an internal fluid flow path between the one or more inlets and the tower outlets;
a turbine in the fluid flow path;
wherein the scoop concentrates air to be directed through the one or more inlets, and wherein the inlet and tower outlets are arranged such that wind creates air flow through the fluid flow path for motivating a turbine.

2. The wind powered generator according to claim 1, wherein the mast is rotatably coupled to a base, the mast configured to rotate such that a windward portion is oriented to face into the wind according to the direction of the wind.

3. The wind powered generator according to claim 1, wherein the tower outlets on the mast are vertically spaced from the one or more inlets.

4. The wind powered generator according to claim 1, wherein the outlets on the mast are higher than the one or more inlets.

5. The wind powered generator according to claim 1, wherein the tower outlets are positioned proximal or before a transition from a windward portion of the mast to a leeward portion of the mast.

6. The wind powered generator according to claim 1, wherein each of the one or more inlets are substantially larger in cross sectional area than each of the tower outlets.

7. The wind powered generator according to claim 1, wherein a combined sum of the cross sectional area of the tower outlets is larger than a combined sum of the cross sectional area of the inlet or inlets.

8. The wind powered generator according to claim 1, wherein the wind powered generator comprises one or more flow regulating means within the flow path.

9. The wind powered generator according to claim 8, wherein the one or more flow regulating means is a gate valve.

10. The wind powered generator according to claim 8, wherein the one or more flow regulating means is a non-return valve.

11. The wind powered generator according to claim 10, wherein the non-return valve is a reed valve.

12. The wind powered generator according to claim 1, wherein the wind powered generator comprises at least two flow regulating means within the flow path, wherein at least one of the flow regulating means is a gate valve, and at least one of the flow regulating means is a non-return valve.

13. The wind powered generator according to claim 1, wherein the wind powered generator comprises at least one gate valve configured to throttle airflow into the turbine.

14. The wind powered generator according to claim 1, wherein the wind powered generator comprises at least one non-return valve configured to operate one or more tower outlets selectively or automatically.

15. The wind powered generator according to claim 14, wherein the at least one non-return valve is further configured to prevent reverse flow of air through the one or more tower outlets.

16. The wind powered generator according to claim 1, wherein the mast comprises baffles configured to better align air flow at the tower outlets.

17. The wind powered generator according to claim 1, wherein the wind powered generator comprises a plurality of column turning vanes configured to direct air flow travelling up an internal column cavity of the mast, out toward a leeward portion, so that air flow is substantially aligned with the direction of the wind upon exiting the mast.

18. The wind powered generator according to claim 17, wherein the mast comprises an outlet cavity, a leeward cavity, and a plurality of outlet channel turning vanes configured to turn the air flow from leeward in the leeward cavity, to windward in the outlet cavity.

19. The wind powered generator according to claim 18, wherein the outlet channel turning vanes comprise non-return valves configured to limit reverse flow between the outlet cavity and the leeward cavity.

20. The wind powered generator according to claim 18, wherein the mast comprises a plurality of outlet turning vanes configured to turn the air flow from windward in the outlet cavity to leeward upon exiting the tower outlets.

21. The wind powered generator according to claim 18, wherein the outlet turning vanes comprise non-return valves configured to limit reverse flow into the outlet cavity from the freestream air flow.

22. The wind powered generator according to claim 17, wherein the column turning vanes comprise non-return valves configured to limit reverse flow between the leeward cavity and the column cavity.

23. A method of generating power comprising
positioning a mast such that a windward portion faces into the wind according to the direction of the wind;
providing one or more inlets on the mast;
providing one or more tower outlets on the mast on a side portion of the mast such that when the wind flows across the one or more tower outlets a pressure differential is created between the one or more tower outlets and the one or more inlets to create an air flow through an internal fluid flow path between the one or more tower outlets and the one or more inlets; and;
providing a turbine in the fluid flow path configured to operate when the air flow is created in the fluid flow path such that the turbine generates power.

24. A wind powered generator comprising:
a mast rotatably coupled to a base, the mast configured to rotate such that a windward portion is oriented to face into the wind according to the direction of the wind;
one or more tower outlets positioned on a side portion of the mast and one or more inlets positioned on the windward portion of the mast;
an internal fluid flow path between the one or more tower outlets and the one or more inlets; and
a turbine in the fluid flow path such that when the one or more inlets receives an air flow, the air flow is moved through the fluid flow path operating the turbine.

25. A wind powered generator comprising:
a mast rotatably coupled to a base, the mast configured to rotate such that a windward portion is oriented to face into the wind according to the direction of the wind;
one or more tower outlets positioned on a low pressure portion of the mast and one or more inlets positioned on a high pressure portion of the mast;
an internal fluid flow path between the one or more tower outlets and the one or more inlets;
a turbine in the fluid flow path such that a pressure differential between the one or more tower outlets and the one or more inlets generates an air flow that operates the turbine.

26. A wind powered generator comprising:
a mast rotatably coupled to a base, the mast configured to rotate such that a windward portion is oriented to face into the wind according to the direction of the wind;
one or more tower outlets positioned at a different height on the mast relative to one or more inlets position on the mast;
a conduit defining an internal fluid flow path between the one or more tower outlets and the one or more inlets;
a turbine in the fluid flow path such that a pressure differential between the one or more tower outlets and the one or more inlets generates an air flow that operates the turbine.

* * * * *